J. BENTZ.
Steam-Cookers.
No. 145,981. Patented Dec 30, 1873.
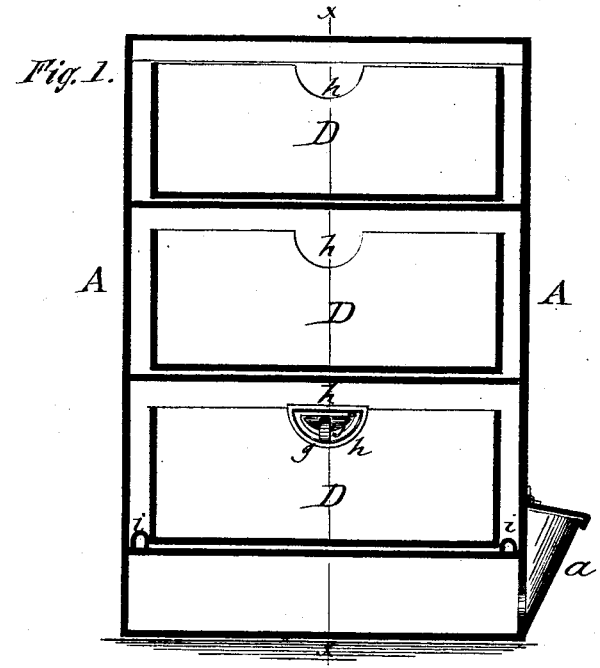
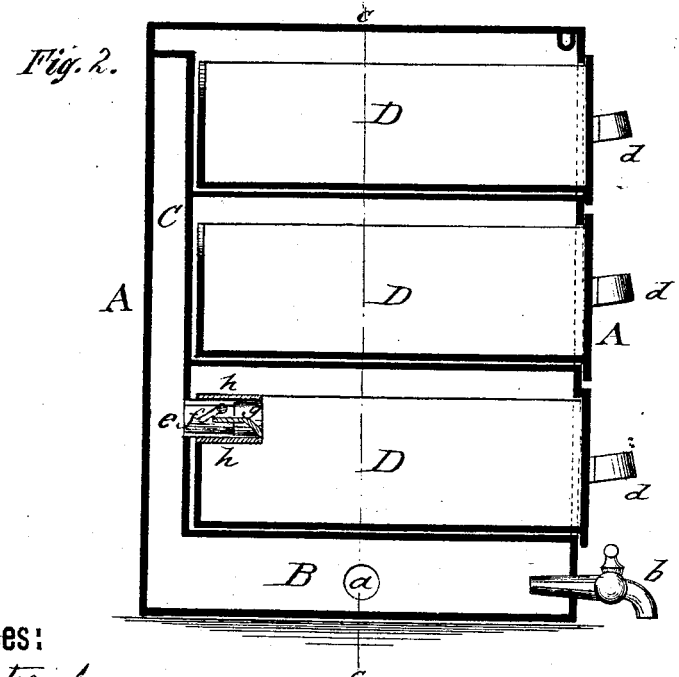
Witnesses:
P. C. Dieterich.
Sedgwick
Inventor:
J. Bentz
Per
Munn
Attorneys.

UNITED STATES PATENT OFFICE.

JOHN BENTZ, OF PARKERSBURG, WEST VIRGINIA.

IMPROVEMENT IN STEAM COOKERS.

Specification forming part of Letters Patent No. 145,981, dated December 30, 1873; application filed November 15, 1873.

*To all whom it may concern:*

Be it known that I, JOHN BENTZ, of Parkersburg, in the county of Wood and State of West Virginia, have invented a new and Improved Steam Cooker, of which the following is a specification:

In the accompanying drawing, Figure 1 is a vertical lateral section of my improved steam cooker on the line $c\ c$, Fig. 2; and Fig. 2 is a vertical longitudinal section of the same on the line $x\ x$, Fig. 1.

Similar letters of reference indicate corresponding parts.

The object of my invention is to furnish to families, restaurants, hotels, &c., a steam cooking apparatus, which admits the steam to the victuals in each part or drawer thereof on closing the drawers, shutting off the steam on opening the drawers. No steam can thereby escape and burn the fingers, but the cooker works uniformly with the full heating power. My invention consists in the arrangement of the different parts of the cooker above each other, separated by partitions, and connected at their rear sides with a vertical extension of the boiler. The steam enters through short tubes, with valves applied therein, opening into larger tubes of the drawers, with horizontal guide-pins, which push the valves open when the drawers are within the cooker, and shut off the steam when the drawers are opened for inspection.

In the drawing, A represents the body of the cooker, of sheet metal or other suitable material. The boiler B forms the lowest part of the cooker, and is supplied with a funnel-shaped opening, $a$, for the admission of the water, and a faucet to draw hot water for coffee, tea, or other purposes. A vertical extension, C, of the boiler on the rear part of the cooker communicates the steam to the different drawers D, arranged in suitable partitions of the cooker. Handles $d$ of the drawers serve to open and close the same in placing the meat or other victuals to be cooked therein, or to supervise their cooking. Suitable apertures and tubes $e$, of round, oval, or semicircular shape, lead the steam into drawer D. Valves $f$ are hinged or otherwise applied inside of tubes $e$, and acted upon by horizontal rods $g$, which are rigidly applied to tubes $h$, of slightly larger size than tubes $e$. They are of similar shape, applied at rear part of drawer D, and fit closely over tubes $e$ when the drawers D are pushed in. Valves $f$ are held open by rods $g$, and admit the steam to the drawers. When drawers D are opened, rods $g$ release the valves $f$, tubes $h$ and $e$ disconnect, valves $f$ close tubes $e$, and the steam is shut off from entering, so that no heating power is wasted, and no scalding of the hands is possible. Suitable guide-strips $i$ of the cooker-partitions run along the sides of the drawers, and allow the drawer-tubes $h$ to glide easily and without interruption over the boiler-tubes $e$, opening valves $f$ by rods $g$, and admitting the steam to the drawers.

Having thus described my invention, I claim as new and desire to secure by Letters Patent—

1. The steam cooker arranged with partitions above boiler B, and boiler-extension C along rear side, with tubes $e$ and valves $f$, substantially as described.

2. Drawers D, having tubes $h$, and rods $g$ for opening and closing valves $f$, as set forth.

JOHN BENTZ.

Witnesses:
    J. P. VAUGHAN,
    CHARLES J. BOSBURY.